Dec. 10, 1940.   H. MANRODT ET AL   2,224,688
COMBUSTION ENGINE WITH ROTARY VALVE
Filed Jan. 18, 1939   4 Sheets-Sheet 1

INVENTORS
Henry Manrodt and
Manfred Manrodt
BY
ATTORNEY

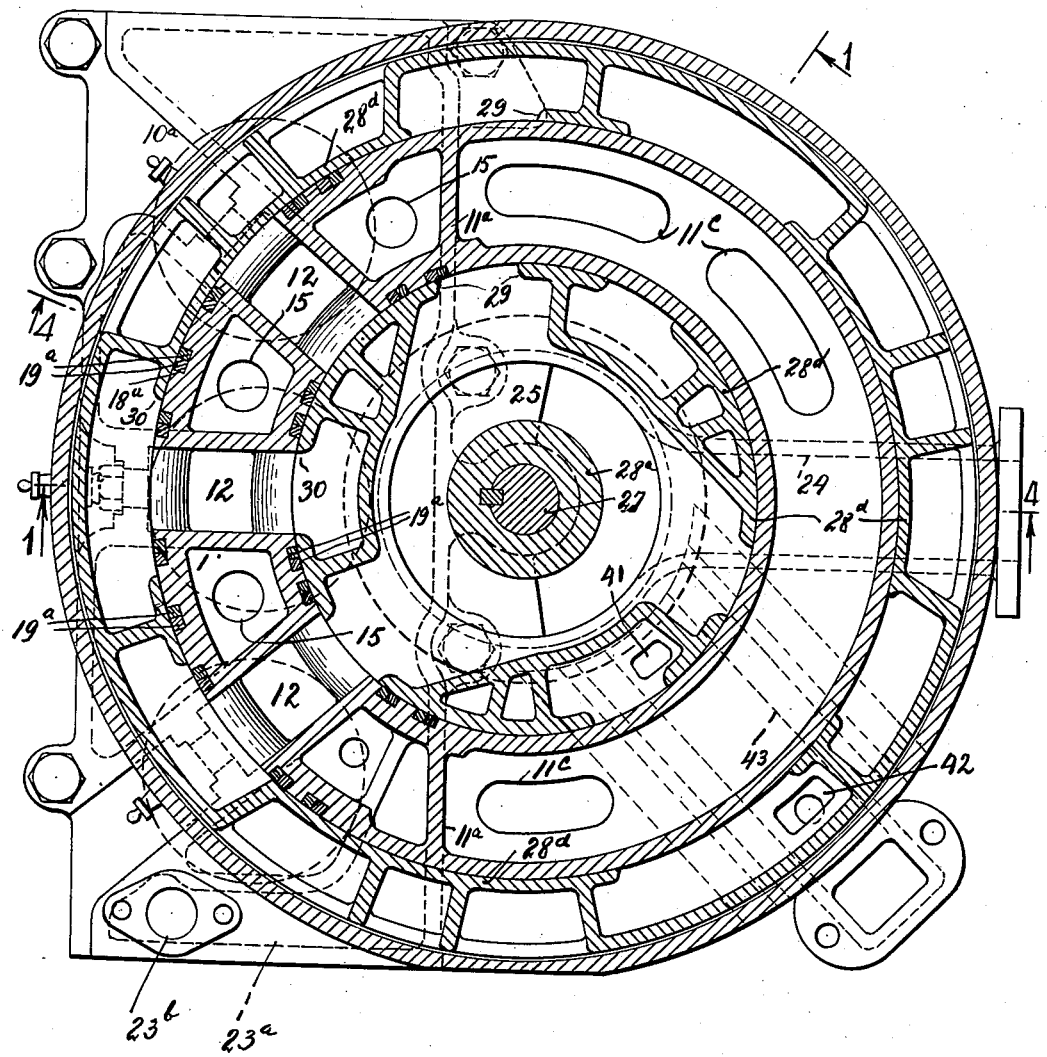

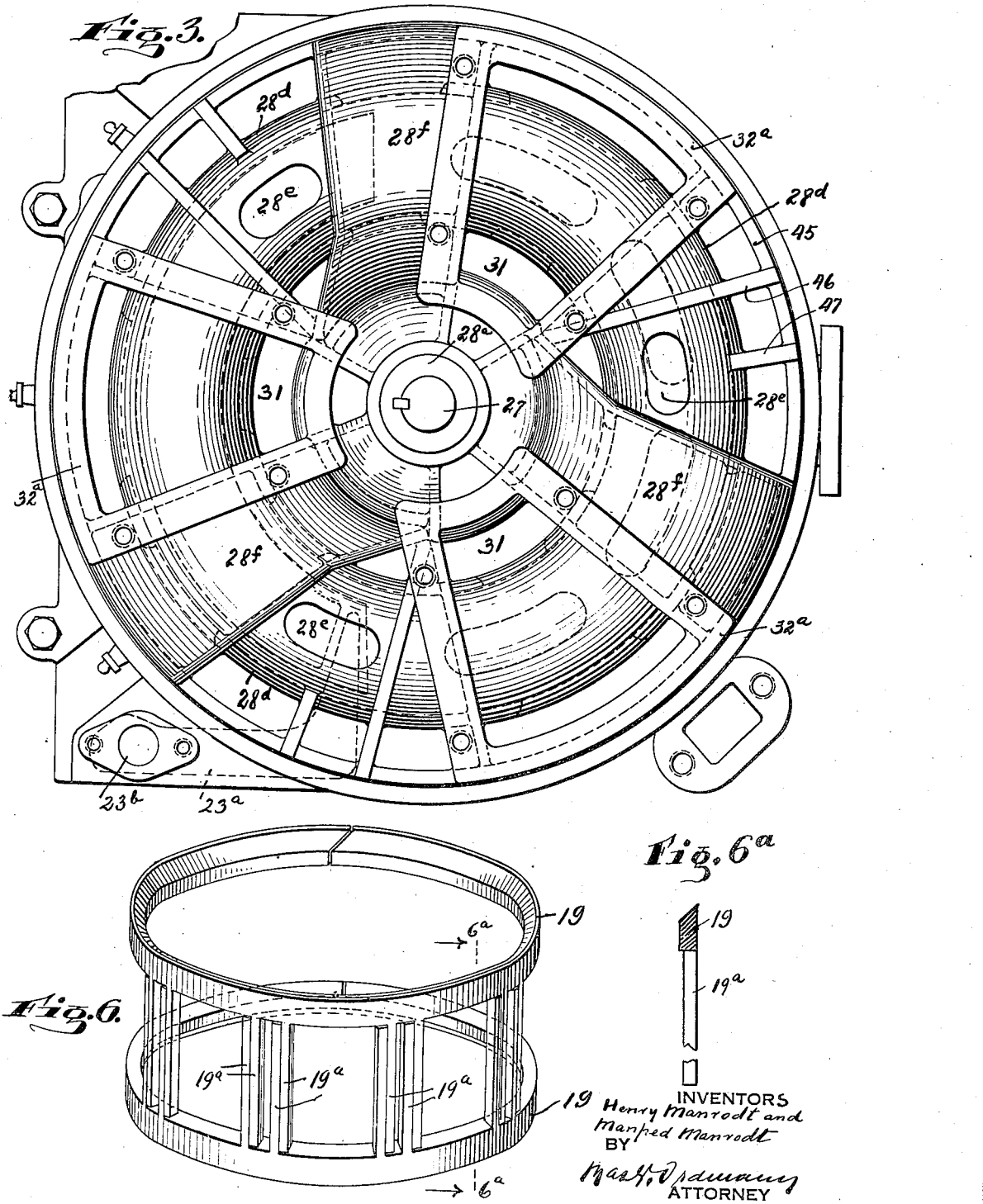

Dec. 10, 1940.  H. MANRODT ET AL  2,224,688
COMBUSTION ENGINE WITH ROTARY VALVE
Filed Jan. 18, 1939  4 Sheets-Sheet 4
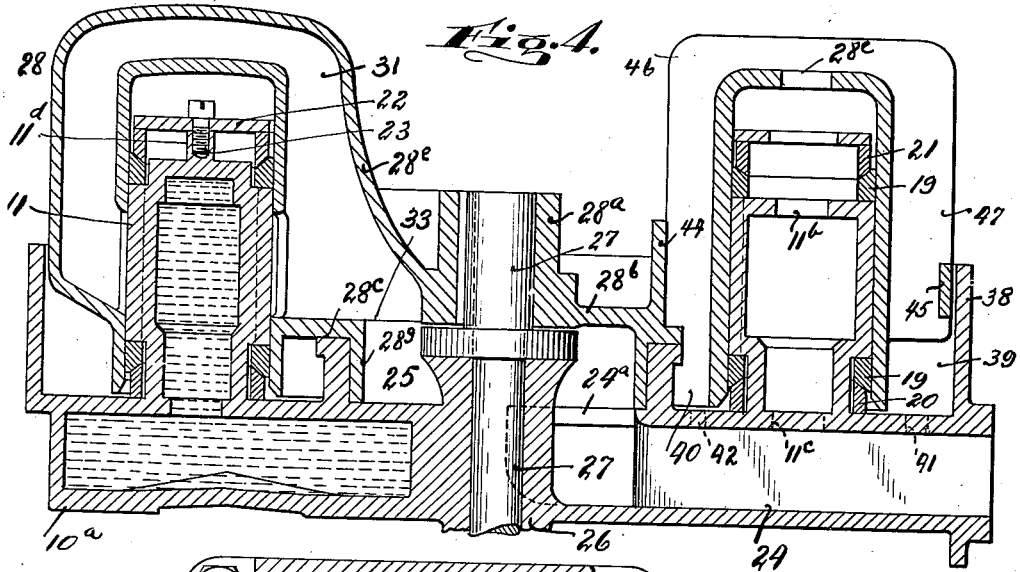
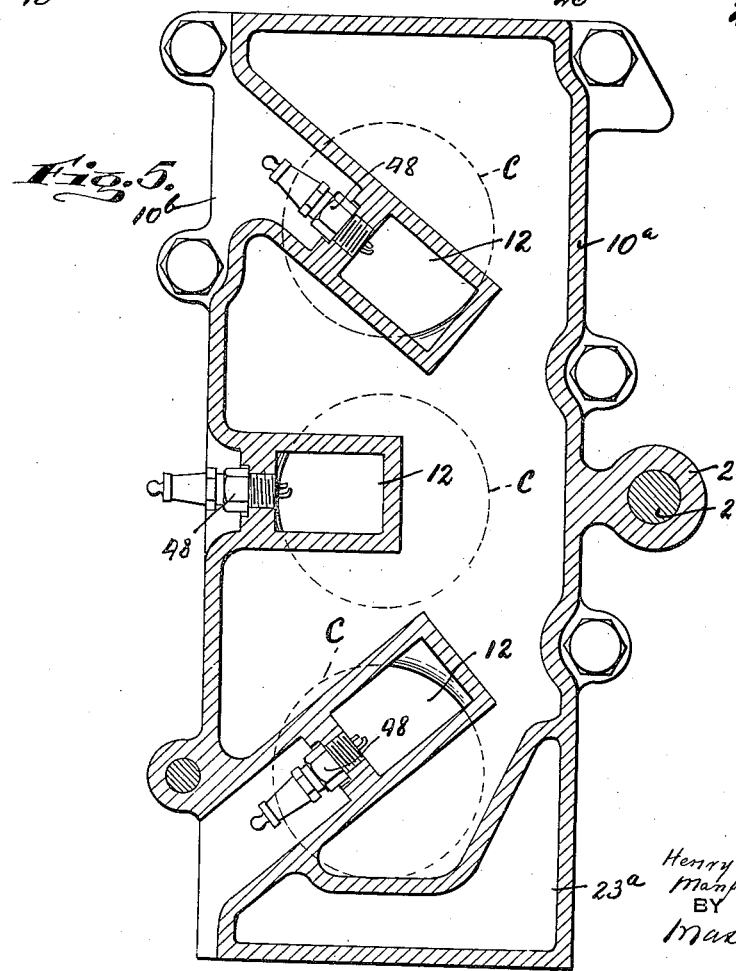
INVENTORS
Henry Manrodt and
Manfred Manrodt
BY
Mark H. Ordmann
ATTORNEY Patented Dec. 10, 1940

2,224,688

UNITED STATES PATENT OFFICE 2,224,688

COMBUSTION ENGINE WITH ROTARY VALVE

Henry Manrodt, Newark, N. J., and Manfred Manrodt, Baltimore, Md., assignors of one-third to Hans Manrodt, Union, N. J.

Application January 18, 1939, Serial No. 251,466

20 Claims. (Cl. 123—190)

This application is a continuation in part of our application No. 114,570, filed December 7, 1936. It relates to internal combustion engines and has for its object the provision of a balanced rotary valve adapted to replace the common inlet and exhaust valves hitherto used with internal combustion engines and to control all cyclic operations of the engine during a single revolution thereof.

Another object of this invention is to provide a single valve for a multiple cylinder engine that will operate as a common control of the cyclic operation in a number of cylinders during a single revolution.

A still further object of this invention is to provide a rotary valve revolubly mounted on a cylinder head which is extended beyond the cylinder block and in which the part covering said cylinder block is watercooled and the extended part is air cooled, whereby the valve is effectively cooled during its operation.

Another object of this invention is to provide a multiple cylinder combustion engine having a cylinder head formed with an annular hollow body over which a rotary valve is adapted to telescope and revolve without any frictional contact and which has a number of explosion chambers communicating with the said cylinders and adapted to be successively controlled by said valve during a single revolution.

Another object of this invention is to provide a rotary valve in form of an inverted annular channel adapted to fit over and revolve around said stationary annular hollow body of the cylinder head, and provide said valve with a plurality of suction chambers and exhaust passages extending laterally of and around the top of said stationary body and adapted to periodically communicate with the explosion chambers in said stationary body.

A further object is to provide a valve which will revolve around the stationary cylinder head with a minimum of friction.

A further object of this invention is to provide a valve construction in which the heat of the exhaust gases are directed against the outside walls and in which said outside walls are constantly exposed to the atmosphere and thereby properly cooled.

A further object of this invention is to provide packing means adapted to produce an effective seal between the stationary hollow body of the cylinder head and said rotary valve.

Still another object is to provide a construction which will permit the valve to expand in all directions when heated without affecting the seal.

With these and other objects in view, our invention consists in the novel construction, combination and arrangement of parts as will be hereinafter more fully described and shown in the accompanying drawings, which form part of this specification and in which similar reference characters denote corresponding parts.

Our rotary valve can be used to control a plurality of cylinders of a multiple cylinder explosion engine in which the cylinders may be arranged either in a straight line, circular or any other formation. In the present example we have chosen an engine of the usual construction in which the cylinders are arranged in a straight line.

Figure 2 is a cross section on line 2—2 of Figure 1;

Figure 3 is a top plan view of the valve with the branched exhaust structure removed;

Figure 4 is a vertical section on line 4—4 of Figure 2; and

Figure 5 is a vertical section on line 5—5 of Figure 1.

Figure 6 is a perspective view of the packing means; and

Figure 6a is a section on line 6a—6a of Figure 6.

Figure 1:
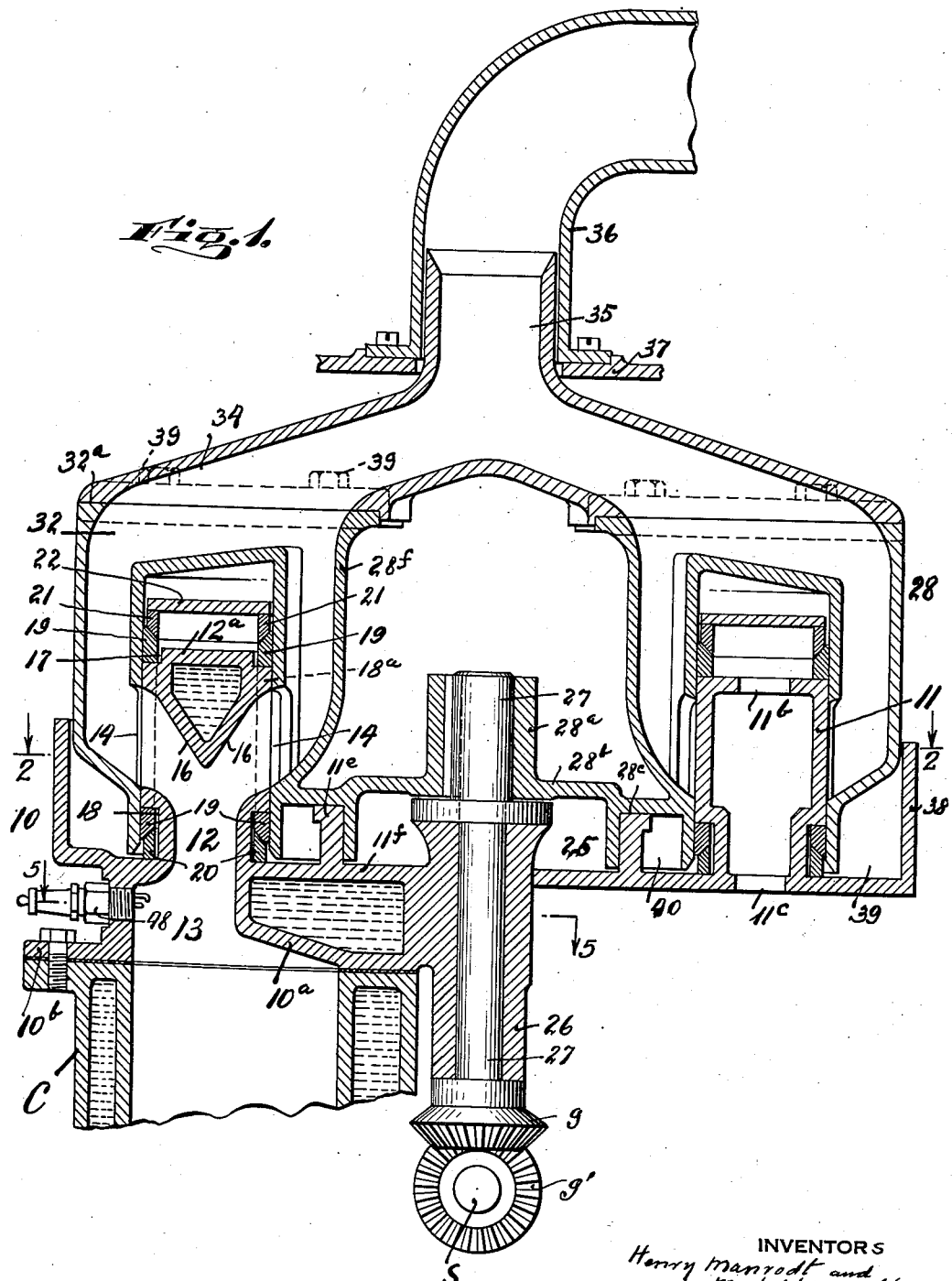
Figure 1 is a vertical section on line 1—1 of Figure 2 of the cylinder head fixed to cylinder block of a multi-cylinder internal explosion engine and of the rotary valve body shown in operative position on said head.

In the drawing C denotes a multi-cylinder block (in the present embodiment three cylinders C being shown arranged in a straight line formation) which may be of the convention construction. Mounted on the cylinder block and tightly fixed thereto is the cylinder head 10 which comprises a hollow water cooled base portion 10a of substantially rectangular shape formed with flanges 10b adapted to be screwed to the cylinder block.

The base portion 10a of the cylinder head is extended laterally relative to said cylinder block in horizontal direction and formed with a vertically projecting annular cylindrical hollow body 11 whose circumferential walls (according to the number of cylinders to be controlled by a single valve and according to the arrangement thereof, whether in a straight line or in circular formation) are so admeasured in diameter that the annular space between the same will eccentrically intersect a number of cylinders (in the present instance three cylinders) as shown in Figures 1 and 2. This annular space in diameter is smaller than that of the cylinders and the part above the cylinder block is closed on top and so partitioned as to form chambers 12 (Figures 2 and 5) one for each cylinder. Each chamber 12 has a passage 13 leading downwardly into the open top of the respective cylinder (Figure 1). Each chamber 12 of the cylinders is provided with port holes 14 in its outer and inner walls adapted to be controlled by the common rotary valve to be hereinafter more fully described. The space around said chambers 12 in the portion of the annular body 11 directly above the cylinder block is closed off at both ends at 11ª (Figure 2) against the space in the portion projecting laterally from the cylinder head and has bottom openings 15 leading into the hollow base 10ª for the circulation of cooling water (Figures 2 and 4). The laterally projecting portion of the annular hollow body 11 has openings 11ᵇ, 11ᶜ (Figures 2 and 4) in its top and bottom for the circulation of cooling air.

The top 12ª of each chamber 12 is hollow and formed with downwardly and centrally converging walls 16 which with the upper rounded edges of the top of the chamber 12 form two oppositely extending channels or passages directed toward the port holes 14 for the admission of fuel and the discharge of exhaust gases during the suction and exhaust periods, as will be more fully explained.

In the outer faces of each of the annular walls of body 11 adjacent said port holes 14 we provide in the upper and lower ends thereof annular recesses 17, 18 and a plurality of parallel vertical grooves 18ª to extend from each one of the annular recesses to the other for the reception of packing members.

These packing members (as best shown in Figure 6) preferably are made of cast iron and may consist of annular resilient split bands 19, each formed with a plurality of tongues or legs 19ª of equal length extending at a right angle thereto. When assembled the annular bands 19 are placed in said recesses 17, 18 with their tongues or legs 19ª extending in opposite direction and adjacent to one another so that each leg abuts against the corresponding opposite leg. Each tongue or leg in thickness may be so ad-measured that it will fit with its companion opposite leg in a single groove 18ª. In the present example, as seen from Figure 2, there are two pairs of such vertical tongues or legs on each side of a chamber 12 in the inner and outer walls of the annular body 11.

The outer end surfaces of the rings or bands 19 are bevelled as shown in Figure 1, the bevelled surface of the lower ring or band 19 being adapted to bear on a correspondingly bevelled surface of a split pressure ring 20. Bearing on the bevelled surface of the upper ring or band 19 with a correspondingly bevelled surface is another split pressure ring 21. These pressure rings are preferably made of steel and of somewhat less thickness than that of the bands 19 and serve merely to press the latter into tightening position between the walls of the stationary annular body and the rotary valve. The outer circumferential surfaces of said split cast iron packing rings 19 are finished and in thickness a small fraction of an inch smaller than the depth of the corresponding grooves 17, 18 to permit expansion. The vertically extending tongues or legs 19ª serve as vertical packing means between the annular body and the valve body and being integral with the rings or bands 19 will expand together with the latter. In length these legs are made slightly shorter, say 2/1000 of an inch, than the vertical grooves 18ª so as to be capable of vertical expansion. The pressure rings are held tightly in tightening position by an annular disk 22 which bears on the upper pressure rings 21 and is fixed to the stationary hollow body 11 by bolts 23 screwed into bosses 11ᵈ projecting therefrom, as shown in Figure 4, or in any other suitable manner.

The top of the water cooled portion of the annular body 11 is inclined and adapted to raise the level of the water circulating therethrough towards a water outlet 23ª and drain 23ᵇ.

Formed in the base portion 10ª of the cylinder head 10 is a fuel suction channel 24 leading from the carbureter (not shown) which at 24ª opens into an annular suction chamber 25 formed centrally in the valve body, as will be hereinafter more fully described.

Formed integrally with the base portion 10ª and extending centrally of the annular body is a bushing 26 in which is adapted to be rotatively borne a shaft 27 for imparting rotation to the rotary valve. This shaft is adapted to be driven from the crank shaft S by bevel gears g, g' or the like.

The valve body 28 consists of a cylindrical body formed with an annular chamber and which centrally is formed with a cylindrical hub 28ª mounted on and keyed to the shaft 27. Projecting from the hub 28ª is a disk like cross piece 28ᵇ provided between the inner and outer walls of said valve body and whose lower marginal face 28ᶜ is adapted to bear on the upper edge of an annular wall 11ᵉ projecting from the bottom 11ᶠ of the stationary body 11. These bearing surfaces are adapted to be well lubricated and constitute the sole vertical support for the valve body, so that the latter is free to expand in all directions. The annular channel of said valve body is open at its bottom and except for some air holes, to be hereinafter specified, closed on top and is adapted to telescopically fit over and revolubly engage around the stationary annular body 11 of the cylinder head.

For the control of the different cyclic operations in each cylinder the inner and outer walls of the annular space of the said valve body 28 are cut away at certain places, as at 29, 30, to form ports which will periodically coincide with the ports 14 during the suction and exhaust periods. The remaining portions 28ᵈ of said walls serve to close the ports 14 during the compression and explosion periods. Built around the cut out portions 29 of the annular space are walls 28ᵉ which form chambers 31 extending laterally thereof and over the top of the stationary body 11 and which constitute suction chambers (Figures 3 and 4). Built around the cut out portions 30 are walls 28ᶠ which form channels 32 extending laterally thereof and over the top of the annular body 11 and which constitute exhaust passages. By the above described arrangement the interior of the valve body is divided into three sections equidistantly spaced 120° apart and adapted to successively cooperate with the chambers 12 of the stationary body 11 to control the different cyclic operations of the three cylinders.

Each suction chamber 31 communicates through an opening 33 with the annular chamber 25 of the valve body which is formed by an annular flange 28ᵍ projecting downwardly from the member 28ᵇ and concentrically around the upper end of the bushing 26 of shaft 27 and fitting in an annular space formed by the annular wall or flange 11ᵉ of the annular body 11.

The oppositely arranged openings or ports 29 in the walls of the valve body 28 are not in radial alignment but are somewhat displaced relative one another so that as the valve rotates they may be brought to simultaneously coincide with the corresponding ports 14 of the cylinder head.

In the present embodiment the ports 14 in the chamber 12 have each a permanently fixed opening of 15°. The exhaust is adapted to commence 36° before the piston reaches the lower dead center point thus to continue for a period of 216°. The ports 14 remain closed for a period of 6° opening 6° after the upper dead center is reached and stay open until the piston has passed the lower dead center by 12°. The opening of 15° of the stationary port 14 thus corresponds to a period of 180° of the rotation of the crank shaft or movement of the piston.

The exhaust passages 32 of each section lead into a branched channelled body 34 which is formed at its top with a central tubular passage 35 rotatively engaging the bottom end of an exhaust pipe 36 that may be suitably fixed to and supported on arms 37 which may be suitably attached to and projecting from a vertically projecting annular rim 38 forming an integral part of the stationary cylinder head. The body 34 may be a separate piece that may be suitably fixed to the flanged upper edges 32ᵃ of the channels 32 by screw bolts 39 or otherwise.

One of the characteristic novel features of our invention is that the portions of the walls 28ᵈ which serve to close the ports 14 at the compression and explosion periods are at the outer faces continuously exposed to the open air in which they revolve. Additional cooling of the walls of the rotary valve is produced by causing air to circulate through annular cooling chambers 39 and 40 formed around the bottom parts of said walls and formed with passages 41, 42 leading into the same and thence through a pipe 43 into the carbureter (not shown). Furthermore, the top of the valve body 28 above the portions 23ᵈ of the walls which serve to close the ports 14 at the compression and explosion periods may be entirely open or have air holes 28ᶠ, which when passing over the openings 11ᵇ in the top of the stationary body 11 will permit circulation of air through the latter resulting in further cooling of the valve body.

44 and 45 denote annular reinforcing members. Since to produce an effective cooling the air must act close to the top where the walls are hottest, the member 44 is made sufficiently high to prevent the current of the outer air from entering into the annular chamber 40 at the bottom. 46 and 47 denote ribs connected to the reinforcing members 44, 45. The rim 38 is adapted to surround the bottom part of the annular valve body with enough play to prevent friction, and is also made high enough to direct the air currents against the upper parts of the walls of the rotating valve.

48 denote the usual spark plugs fixed at the lower ends of the chambers 12 in the annular body 11.

The mode of operation is as follows:

It is assumed that the valve rotates in clockwise direction. While the pistons make their downward strokes the ports 29 will be brought to coincide with the ports 14 of one of the chambers 12 in the cylinder head, so that fuel gas will be sucked from the carbureter through suction pipe 24, annular suction chamber 25, passage 33 into suction chamber 31 and thence into the chamber 12. This is followed by the upward stroke of the piston in the particular cylinder and during this period the ports 14 will be closed by the portions 28ᵈ of the valve body 28. During this period the fuel gas is compressed, ignited and exploded. This is then followed by the power stroke and shortly before the lower dead center point of the piston stroke is reached the ports 30 of the exhaust channels 32 are brought into coincidence with the ports 14 of chamber 12 and while the piston continues on its upward stroke the gases are discharged through the exhaust channels into the exhaust pipe 36.

The section of the valve body which has functioned during these periods will, as the rotation of the valve continues, pass around the portion of the cylinder head which projects beyond the cylinder block and will be air cooled until it again enters the portion over the cylinder block and reassumes its aforedescribed function.

Since various changes may be made in the construction without departing from the principle of our invention, we do not wish to restrict ourselves to the details described and shown.

What we claim is:

1. In an internal multi-cylinder combustion engine, a cylinder head fixed to the cylinder block and formed with a vertically projecting annular hollow body intersecting a plurality of cylinders, and having chambers communicating with said cylinders and ports in its inner and outer walls, and a rotary annular hollow valve body telescopically mounted around said stationary annular body and adapted to periodically close and open said ports, and thereby control all cyclic operations of said cylinders during a single revolution thereof.

2. In an internal combustion engine according to claim 1, in which said annular body of the cylinder head is laterally extended beyond the cylinder block, said extended portion being air cooled.

3. In an internal combustion engine according to claim 1, in which said rotary valve is so supported around said stationary hollow body as to be capable of expansion in all directions.

4. In an internal multi-cylinder combustion engine of the character described, a cylinder head having a vertically projecting annular hollow body formed with chambers one for each cylinder, a common rotary valve for a number of cylinders to control all cyclic operations of the latter during a single revolution, said rotary valve being telescopically mounted around said hollow body and formed with equidistantly arranged control sections adapted to successively control the operations of each cylinder, and packing means between the inner and outer walls of said chambers and those of said rotary valve.

5. In an internal combustion engine according to claim 1, in which the annular space of said rotary valve is partioned into several equidistantly spaced sections, each section having suction chambers and exhaust channels extending laterally of its annular walls of and over the top of said stationary annular body, each of said chambers and channels having ports adapted to periodically coincide with the ports in said chambers of said stationary body, and the walls intermediate said suction chambers and exhaust channels serving to close said last named ports during the compression and explosion periods.

6. In an internal combustion engine according to claim 4, in which the inner and outer walls of said stationary hollow body are provided with annular recesses both on top and bottom and with vertical grooves adjacent said chambers to bear said packing means and in which means are provided to press said packing means into tightening position.

7. In a multi-cylinder internal combustion engine, a cylinder head formed with a hollow annular body of such diameter and so arranged as to intersect a plurality of cylinders, the portion of said body above the cylinder block being formed with chambers having ports and communicating each with a cylinder and the extended portions thereof having air passages for air cooling, and an annular rotary valve rotatively mounted around said annular body to be capable of expansion in all directions, said valve being formed with equidistantly spaced control sections adapted to periodically cooperate with said ports to control all cyclic operations in the different cylinders during a single revolution thereof.

8. In an internal combustion engine according to claim 7, in which said rotary valve is in form of an annular channel open at its bottom and adapted to telescopically fit around said stationary annular body of the cylinder head.

9. In an internal combustion engine according to claim 7, in which the outer and inner walls of said valve are continuously cooled.

10. In combination oppositely arranged elements, packing means between the same consisting of spaced parallel split rings each formed with a plurality of legs or tongues extending axially from the edges thereof, the legs of the different rings being adapted to abut against one another when in assembled position, and means for pressing said packing means into tightening position.

11. In combination, oppositely arranged elements movable relative to one another, packing means therefor arranged between the same consisting of split rings formed with a plurality of axially extending legs or tongues, and capable of moving relative to one another in axial direction.

12. In combination, oppositely arranged elements movable relative to one another, packing means therefor comprising parallel split rings each formed with axial and parallel oppositely directed projections which in length are shorter than the distance between the opposite rings to permit axial expansion thereof and means for pressing said packing means into tightening position between said elements.

13. The combination according to claim 12, in which said split rings and their legs or tongues act against the walls of said opposite elements by their own pressure.

14. In combination, oppositely arranged elements of which one has circumferential grooves and parallel side grooves extending at right angles to the latter, packing means between said elements comprising split rings adapted to bear in said circumferential grooves and each having projections extending axially and parallelly from the edges of said rings in opposite directions and adapted to bear in said side grooves, said split rings being of greater thickness than that of said projections to cover the ends of said side grooves during the expansion of said packing means.

15. In combination, a stationary element and a movable element, one of said elements having circumferential grooves and parallel side grooves extending at a right angle to the latter, packing means between said elements comprising parallel split rings adapted to bear in said circumferential grooves and each formed with a plurality of projections extending axially and parallelly from the edges of said split rings and bearing in said side grooves, said split rings being of greater thickness than said projections to cover the ends of said side groove during the expansion of said packing means, and means for pressing said packing rings into tightening position.

16. In an internal combustion engine of the character described, a fixed annular hollow cylinder head having a portion extended beyond the cylinder block, an annular hollow valve body telescopically and rotatively mounted around said annular body and adapted to periodically control all cyclic operations of said engine during a single revolution, the inner and outer walls of said annular valve being adapted to be air cooled, as the same in the course of its rotation of said valve, pass over the extended portion of said cylinder head.

17. In an internal combustion engine according to claim 16 in which air cooling means are also provided around the bottom parts of the walls of said rotary valve.

18. In an internal combustion engine according to claim 16 in which cooling chambers are provided around the bottom parts of the walls of said valve.

19. In an internal combustion engine according to claim 16 in which the annular part of said cylinder head and said annular valve body are formed with air holes which are adapted to coincide during the compression and explosion periods and produce cooling of said valve.

20. In an internal combustion engine of the character described a rotary annular hollow valve body whose inner and outer walls are continuously air cooled on top, bottom and sides.

HENRY MANRODT.
MANFRED MANRODT.